May 25, 1948.  L. B. HARRINGTON  2,442,203
ELECTROMAGNETIC MOTOR
Filed Oct. 30, 1944  2 Sheets-Sheet 1

INVENTOR.
LESTER B. HARRINGTON
BY
Whittemore Hulbert + Belknap
ATTORNEY

May 25, 1948. L. B. HARRINGTON 2,442,203
ELECTROMAGNETIC MOTOR
Filed Oct. 30, 1944 2 Sheets-Sheet 2

INVENTOR.
LESTER B. HARRINGTON
BY
Whittemore Hulbert & Belknap
ATTORNEY

Patented May 25, 1948

2,442,203

UNITED STATES PATENT OFFICE 2,442,203

ELECTROMAGNETIC MOTOR

Lester B. Harrington, Detroit, Mich., assignor to Autopulse Corporation, Detroit, Mich., a corporation of Michigan Application October 30, 1944, Serial No. 560,995

10 Claims. (Cl. 172—126)

The invention relates to electromagnetic motors of the reciprocatory type.

This application is a continuation-in-part of my copending application Serial No. 488,318, filed May 22, 1943, now abandoned.

It is the primary object of the invention to obtain a reliable low cost construction adapted for the operation of liquid fuel pumps but also applicable to other uses.

The invention consists in various improved features of construction including, first, the means for electromagnetically pressing together the contacts of the circuit closing switch to maintain effective electrical connection during the interval in which the circuit is closed; second, in utilizing the electromagnetically developed force transmitted through said contacts for assisting in carrying the load; third, in effecting one stroke of the motor by stored force which is electromagnetically generated during the reverse stroke; fourth, where the motor is used for operating a liquid fuel pump, utilizing the stored force for effecting the delivery stroke of the pump, and electromagnetically operating the suction stroke and simultaneously storing the force; fifth, providing a plurality of armatures each bridging an air gap between unlike poles of the electromagnet and cooperating to carry the load while they also function to press the circuit closing contacts together during the interval in which the circuit is closed; sixth, connecting the load directly to the armature which carries the advanced contact (in the direction of movement under electromagnetic force) so that the armature carrying the rear contact will strongly press the latter against said advanced contact; seventh, in locating said rear contact armature in a strong electromagnetic field thereby further augmenting the pressure on said contacts; and, eighth, other features which will be hereinafter set forth.

Figure 1:
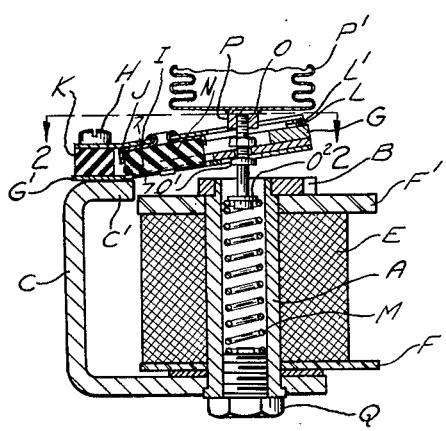
Fig. 1 is a vertical central section through my improved motor showing the same connected to a liquid fuel pump.
Figure 2:
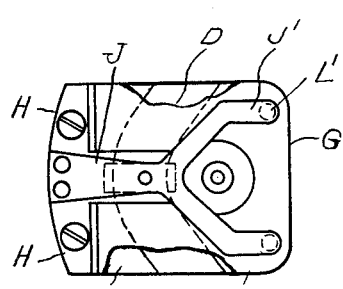
Fig. 2 is a horizontal section on line 2—2, Fig. 1.

With the construction shown in Figs. 1 and 2, A is a hollow core of an electromagnet having secured to one end thereof a pole piece B. C is a U-shaped member of magnetic material having one leg thereof connected to the opposite end of the core A, while the other leg extends in the plane of the pole piece B to form an unlike pole C'. The poles B and C' are spaced from each other to form an air gap D therebetween. E is a winding surrounding the core A having insulator plates F and F'' at opposite ends thereof which separate it from the member C and poles B and C'. G is an armature plate mounted on the member C to bridge across the air gap D and to preferably overlap both poles B and C'. As shown, this member G is centrally cut away to form an aperture extending across the space D and over the poles. It is mounted on the member C preferably by a member G' formed of flexible resilient sheet metal attached to the member C by bolts H. Within the cutaway portion of the armature G is a second armature I which also magnetically bridges the air gap D between the poles B and C'. The armature I is secured to a flexible resilient member J which also is secured to the member C by bolts H but is spaced and insulated from the member G' by an insulator block K. Mounted respectively on the armatures G and I are cooperating contacts L and L' of a circuit closing switch. There is preferably a pair of contacts L directly mounted on the plate G and registering contacts L' which latter are mounted on a Y-shaped extension J' of the member J. The arrangement is such that in the normal position shown in Fig. 1 the contacts L and L' are engaged with each other which will close the electric circuit and energize the magnet thereby causing both armatures G and I to move towards the poles. The movement of the armature I is only opposed by the slight resistance of the member J. The movement of the armature G is, however, resisted, first, by a coil spring M located within the hollow core A which stores the force for the return stroke of the motor and, second, by a direct connection with the load as hereinafter described. Consequently, the contact L' will be strongly pressed against the contact L to maintain good electrical conduction. Also, these contacts form the mechanical couple between the armatures I and G, so that the force generated in the former is transmitted to the latter to assist in carrying the load. The pressure on the contacts may be further augmented, if desired, by arranging the armature I somewhat nearer to the poles than the armature G so that it is in a stronger electromagnetic field, but this arrangement while helpful is not essential to the operation of the device.

Figure 7:
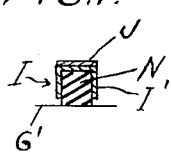
Fig. 7 is a cross section on line 7—7, Fig. 1.

To open the electric circuit, movement of the armature I is arrested at a desired point by a stop N. This, as shown (Figs. 1 and 7), is formed by a fiber block embraced by a U-shaped portion I' of the magnetic metal of the armature but projecting slightly beyond the same. It also overlaps the poles B and C' so as to impinge thereagainst. The stoppage of the armature I will separate the contacts L and L' thereby opening the electric circuit whereupon the contacts L' are returned to their original positions by the resilient member J. The return of the armature G will be variably delayed according to the load which it carries and which may not remain constant. Thus, the circuit will remain open until the completion of the return stroke of the armature G which will again bring the contacts L and L' together.

Where the motor is used for operating a liquid fuel pump, such as one of the bellows type, connection is made between the same and the armature G. Thus, as shown in Fig. 1, a screw O passing through a small aperture in the armature G engages a threaded bearing P at one end of the pump bellows P'. A shoulder O' on said screw bears against the lower face of the armature G and below such bearing is a portion $O^2$ extending into the hollow core A and forming an abutment for the spring M. The opposite end of the spring M abuts against a plug Q having a threaded engagement with the hollow core.

In operation when the energizing circuit for the magnet is closed, both armatures G and I will be moved towards the poles B and C'. However, as the contacts L, L' form a mechanical couple between the armatures I and G, it is evident that the electromagnetic force of both armatures will be transmitted to the spring M to compress the same and store force for the return stroke. Also, as above fully described, the contacts L and L' will be firmly pressed together during the entire movement to maintain a good electrical connection. When the block N contacts with the poles B, C', further movement of the member J is arrested which will separate the contacts L' from the contacts L opening the electric circuit which is not reestablished until the completion of the return stroke of the armature G. As this return stroke under the actuation of the stored force in the spring M' is utilized for compressing the bellows and expelling liquid therefrom, it is evident that the time interval of return may vary. However, whatever the length of the interval, the circuit remains open until the completion of the stroke so that the motor will only operate as fast as is necessary for the work to be performed.

Figure 4:
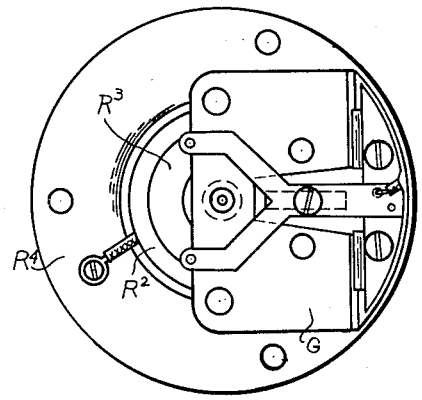
Fig. 4 is a plan view thereof.
Figure 3:
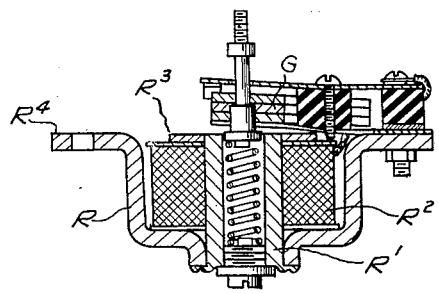
Fig. 3 is a view similar to Fig. 1 showing a modified construction.

In the modified construction shown in Figs. 3 and 4, the operation is essentially the same but instead of having a U-shaped member C for carrying the pole C' into the plane of the pole B, a cup-shaped member R surrounds the hollow core R' and encloses the winding $R^2$. A central pole $R^3$ attached to the core R' is in the same plane as an annular pole $R^4$ formed by a flange on the member R and these poles are separated by an annular air gap therebetween. The two armatures bridge this air gap and are substantially the same in construction as previously described.

Figure 6:
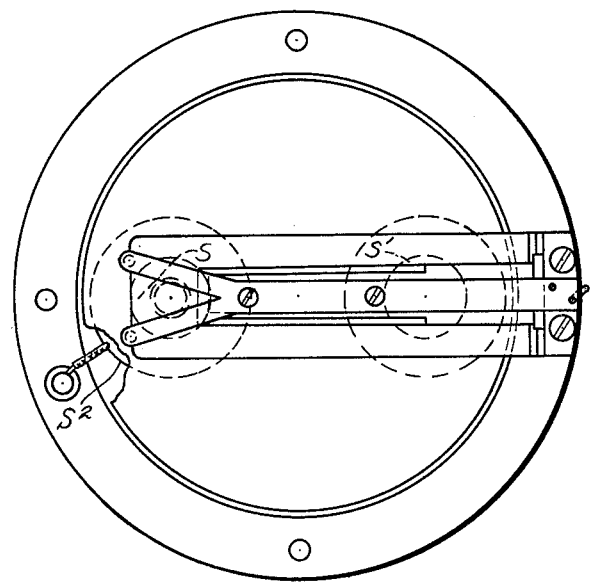
Fig. 6 is a plan view thereof.
Figure 5:
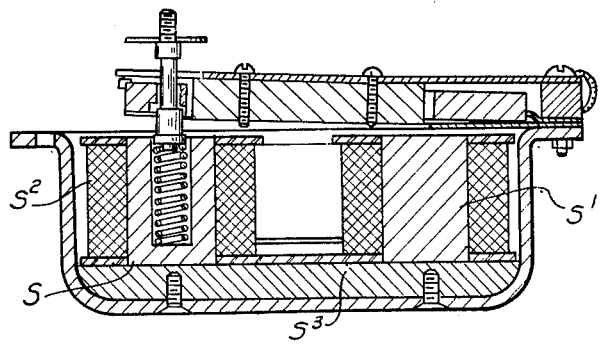
Fig. 5 is a view similar to Fig. 1 showing another modification.

In the modified construction shown in Figs. 5 and 6, two spaced core members S and S', each having a winding $S^2$ therearound, are connected at one end by the member $S^3$ forming poles at the opposite ends with an air gap therebetween. Two armatures bridge across these poles and are of a similar construction to those previously described.

What I claim as my invention is:

1. An electromagnetic motor comprising an electromagnet having unlike poles spaced to form an air gap therebetween, a plurality of armatures each mounted to magnetically bridge said air gap, means for storing energy by the movement of said armatures in one direction, said armatures being so mounted as to be actuated in the same direction when said electromagnet is energized and both cooperating to actuate said energy-storing means, a variable load means opposing the return stroke of one of said armatures, said stored energy operating to move said variable load means when the electromagnet is deenergized.

2. An electromagnetic motor comprising an electromagnet having unlike poles spaced to form an air gap therebetween, a plurality of armatures each mounted to magnetically bridge said air gap, means for storing energy by the movement of said armatures in one direction, said armatures being so mounted as to be actuated in the same direction when said electromagnet is energized, a circuit-closing switch having the cooperating contacts thereof respectively carried by said armatures and constituting a mechanical couple therebetween, the armature for the advance contact being directly connected to said energy-storing means and retarded thereby whereby said contacts will be firmly pressed together by the armature for the rear contact which also assists in actuating said energy-storing means, means for arresting movement of said rear armature before said advance armature to separate said contacts and deenergize said electromagnet, means for variably resisting the return movement of said advance armature, and means independent of said variably resisting means for returning said rear armature when said electromagnet is deenergized.

3. An electromagnetic motor comprising an electromagnet having unlike poles spaced to form an air gap therebetween, a plurality of armatures each mounted to magnetically bridge said air gap, means for storing energy by the movement of said armatures in one direction, said armatures being so mounted as to be actuated in the same direction when said electromagnet is energized and both cooperating to actuate said energy-storing means, the advance armature being directly connected thereto and the rear armature transmitting its force through the first, a variable load means opposing the return stroke of said advance armature, said stored energy operating to move said variable load means when said electromagnet is deenergized, a circuit-closing switch having the cooperating contacts thereof respectively carried by said armatures and constituting a mechanical couple therebetween in the first mentioned direction of reciprocation, means for arresting movement of said rear armature before said advance armature to separate said contacts and deenergize said electromagnet, and means independent of said energy-storing means for returning said rear armature when said electromagnet is deenergized.

4. An electromagnetic motor comprising an electromagnet having unlike poles spaced to form an air gap therebetween, a plurality of armatures each mounted to magnetically bridge said air gap, a drive spring, the advance armature being so mounted as to compress said drive spring when said electromagnet is energized, the rear armature being so mounted as to be actuated in the same direction as said advance armature when said electromagnet is energized and cooperating with said advance armature to compress said drive spring, a circuit-closing switch having the cooperating contacts thereof respectively carried by said advance and rear armatures and constituting a mechanical couple therebetween, said advance armature being directly connected to said drive spring and retarded thereby whereby said contacts will be firmly pressed together by the pull of said rear armature which also assists in compressing said drive spring, said rear armature being movable through a strong magnetic field during the period in which said electromagnet is energized, means for arresting movement of said rear armature before said advance armature to separate said contacts and deenergize said electromagnet, means for variably resisting the return movement of said advance armature, and means independent of said variably resisting means for returning said rear armature when said electromagnet is deenergized.

5. An electromagnetic motor comprising a hollow magnetic core member, an electromagnetic winding therearound, a pole piece at one end of said core member, a magnetic member extending from the opposite end of said core to a point adjacent said pole piece and forming an unlike pole spaced therefrom by an air gap, an armature extending across said pole pieces to form a magnetic bridge therebetween, a second armature also extending across said pole pieces to form a magnetic bridge therebetween, a coil spring within said hollow core, both of said armatures being so mounted as to be actuated in the same direction when said electromagnet is energized, a circuit-closing switch having the cooperating contacts thereof respectively carried by said armatures and constituting a mechanical couple therebetween, said first armature for the advance contact being directly connected to said coil spring and retarded thereby whereby said contacts will be firmly pressed together by the pull of said second armature which also assists in compressing said coil spring, means for arresting movement of said second armature carrying the rear contact before said first armature to separate said contacts and deenergize said electromagnet, means for variably resisting the return movement of said advance armature, and means independent of said variably resisting means for returning said second armature when said electromagnet is deenergized.

6. A motor comprising an electromagnet having a central pole and a surrounding annular pole, a hinged armature extending across both of said poles and provided with a central cut-out, a second armature extending into said cut-out to also bridge said poles, resilient means for yieldably holding said second armature in normal position spaced from said poles, cooperating contacts for controlling the energizing circuit of said electromagnet, said contacts being respectively carried by said armatures, resilient means for moving said first armature counter to the electromagnetic force to close said cooperating contacts thereby energizing said electromagnet and moving both armatures simultaneously towards said poles while maintaining said contacts closed, and a stop for arresting movement of said second armature to separate said contacts and deenergize said electromagnet whereupon said second armature will be returned to normal position during the continued inertial movement of said first armature.

7. A motor comprising an electromagnet having a central pole and a surrounding annular pole, a U-shaped armature hinged at the ends of the U and extending across both of said poles, a second armature extending into the space within the U to also bridge said poles, resilient means for yieldably holding said second armature in normal position spaced from said poles, an insulator support for said resilient means, cooperating pairs of contacts respectively mounted on said first armature and said resilient means, said cooperating contacts controlling the energizing circuit of said electromagnet, resilient means for moving said first armature counter to the electromagnetic force to close said cooperating contacts thereby energizing said electromagnet and moving both armatures simultaneously towards said poles while maintaining said contacts closed, and a stop for arresting movement of said second armature to separate said contacts and deenergize said electromagnet whereupon said second armature will be returned to normal position during the continued inertial movement of said first armature.

8. A motor comprising a cup-shaped casing formed of magnetic material terminating in an annular flange, a hollow magnetic core centrally within said casing having a circular flange at its outer end, an energizing coil surrounding said core and within said cup, a U-shaped armature hinged at the ends of the U to said annular flange and extending across both of said flanges which latter constitute poles of the electromagnet, a second armature within the U also bridging across said poles, a resilient member for yieldably supporting said second armature and having a Y-shaped extension terminating in contact members, an insulator support for said resilient member on said annular flange, contacts on said first armature for cooperating with the contacts on said Y-shaped extensions, said cooperating contacts controlling the energizing circuit for said coil, a coil spring within said hollow core bearing against said first armature to move the same counter to the electromagnetic force into a position for closing said cooperating contacts thereby energizing said electromagnet and moving both of said armatures towards said poles while maintaining said cooperating contacts closed, and a stop for arresting movement of said second armature to separate said contacts and deenergize said electromagnet whereupon said second armature will be returned to normal position during the continued inertial movement of said first armature.

9. A motor comprising a cup-shaped casing formed of magnetic material terminating in an annular flange, a hollow magnetic core centrally within said casing having a circular flange at its outer end, an energizing coil surrounding said core and within said cup, a U-shaped armature hinged at the ends of the U to said annular flange and extending across both of said flanges which latter constitute poles of the electromagnet, a second armature within the U also bridging across said poles, a resilient member for yieldably supporting said second armature and having a Y-shaped extension terminating in contact members, an insulator support for said resilient member on said annular flange, contacts on said first armature for cooperating with the contacts on said Y-shaped extensions, said cooperating contacts controlling the energizing circuit for said coil, a coil spring within said hollow core bearing against said first armature to move the same counter to the electromagnetic force into a position for closing said cooperating contacts thereby energizing said electromagnet and moving both of said armatures towards said poles while maintaining said cooperating contacts closed, a stop for arresting movement of said second armature to separate said contacts and deenergize said electromagnet whereupon said second armature will be returned to normal position during the continued inertial movement of said first armature, and a power take-off with said first armature.

10. A motor comprising a cup-shaped casing formed of magnetic material terminating in an annular flange, a hollow magnetic core centrally within said casing having a circular flange at its outer end, an energizing coil surrounding said core and within said cup, a U-shaped armature hinged at the ends of the U to said annular flange and extending across both of said flanges which latter constitute poles of the electromagnet, a second armature within the U also bridging across said poles, a resilient member for yieldably supporting said second armature and having a Y-shaped extension terminating in contact members, an insulator support for said resilient member on said annular flange, contacts on said first armature for cooperating with the contacts on said Y-shaped extensions, said cooperating contacts controlling the energizing circuit for said coil, a coil spring within said hollow core, a member bearing against the outer end of said spring and engaging a recess in said first armature adapted to move the latter against the magnetic force into a position for closing said cooperating contacts thereby energizing said electromagnet and moving both armatures simultaneously against said poles while maintaining said contacts closed, a stop for arresting movement of said second armature to separate said contacts and deenergize said electromagnet whereupon said second armature will be returned to normal position during the continued inertial movement of said first armature, and a power take-off connected to said spring engaging member.

LESTER B. HARRINGTON.

REFERENCES CITED

The following references are of record in the file of this patent:

UNITED STATES PATENTS

| Number | Name | Date |
|---|---|---|
| 1,429,009 | Wynne | Sept. 12, 1922 |
| 1,750,902 | Obergfell | Mar. 18, 1930 |